Jan. 7, 1941.  E. G. STILES  2,227,678
ARC WELDER
Filed Feb. 23, 1938  4 Sheets-Sheet 1

WELDING ARC

ARC

INVENTOR
EDGAR G. STILES
BY *Falvey & Stottenberg*
ATTORNEY

Jan. 7, 1941. E. G. STILES 2,227,678
ARC WELDER
Filed Feb. 23, 1938 4 Sheets-Sheet 2

INVENTOR
EDGAR G. STILES
BY Falvey & Stoltenberg
ATTORNEY

Jan. 7, 1941.  E. G. STILES  2,227,678
ARC WELDER
Filed Feb. 23, 1938    4 Sheets-Sheet 3

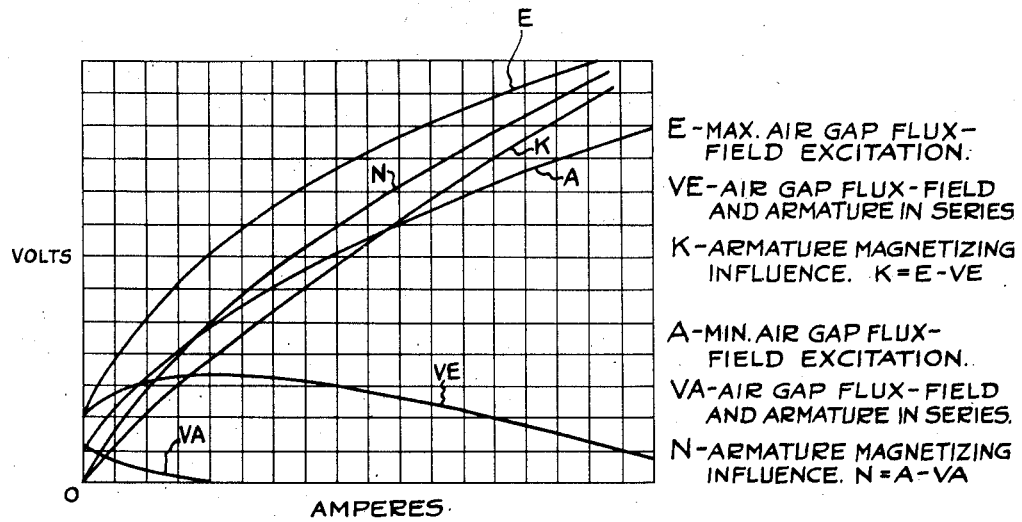

Fig. 4

E – MAX. AIR GAP FLUX – FIELD EXCITATION.
VE – AIR GAP FLUX – FIELD AND ARMATURE IN SERIES
K – ARMATURE MAGNETIZING INFLUENCE. K = E – VE

A – MIN. AIR GAP FLUX – FIELD EXCITATION.
VA – AIR GAP FLUX – FIELD AND ARMATURE IN SERIES.
N – ARMATURE MAGNETIZING INFLUENCE. N = A – VA

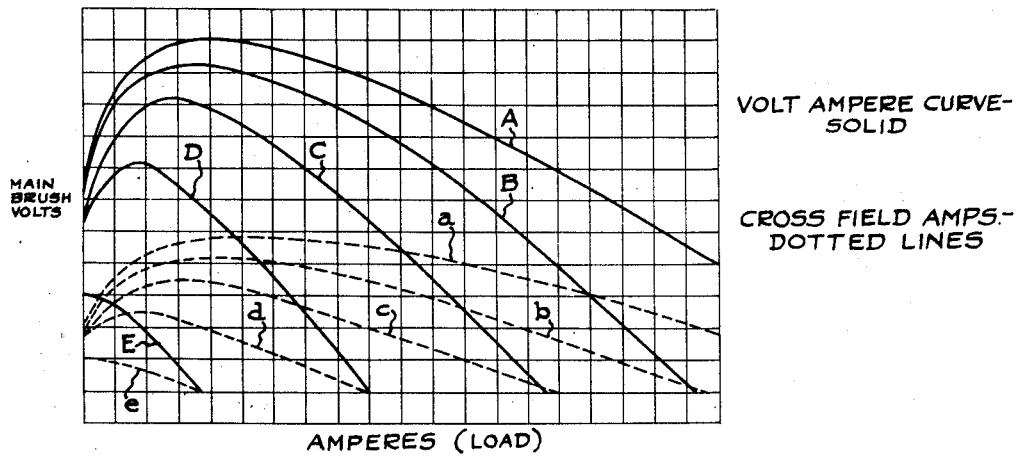

Fig. 5

VOLT AMPERE CURVE – SOLID

CROSS FIELD AMPS. – DOTTED LINES

INVENTOR
EDGAR G. STILES
BY *Galvey & Stoltenberg*
ATTORNEY

SHORT CIRCUIT
FLUX DISTRIBUTION
IN AIR GAP

⅔ FULL LOAD

¼ FULL LOAD

FULL LOAD

INVENTOR
EDGAR G. STILES
BY Falvey & Stoltenberg
ATTORNEY

Patented Jan. 7, 1941

2,227,678

UNITED STATES PATENT OFFICE 2,227,678

ARC WELDER

Edgar G. Stiles, Syracuse, N. Y.

Application February 23, 1938, Serial No. 191,976

4 Claims. (Cl. 171—227)

This invention relates to arc welding, more particularly to arc welding generators of the cross-field type, generally known as the Rosenberg generator.

In the past, arc welding generators of the Rosenberg type have had their output controlled by varying the saturation of the pole stud by a movable piece of magnetic material as disclosed in Rosenberg Patent No. 1,650,851, or by the control of the armature reaction flux by employing a magnetic shunt between the pole tips in proximity to the armature as disclosed in the patent to Blankenbuehler No. 1,979,665. Machines of the Rosenberg type have, however, not been controlled by shunting the main field flux around the armature by means of a magnetic bridge. In fact, this method of control has been considered impracticable in machines of the Rosenberg type due to their inherent characteristics.

The present invention contemplates the provision of a machine of the latter type in which the output of the welding generator is controlled by shunting the main field flux by a magnetic bridge or shunt around the armature by cooperating with the pole studs and being remote from the pole tips and the armature. The magnetic bridge or shunt is supplied with movable portions which are capable of being manually displaced to provide an air gap of adjustable dimensions in the shunt to vary its reluctance for controlling the amount of flux which the shunt shall carry.

In welding operations, the stability of the arc circuit involves the presence in that circuit of suitable reactance. In ordinary generators which have been adapted to welding the reactance has been supplied external to the generators. Since the Rosenberg generator (Rosenberg Patent No. 1,084,365, 1914) was arranged for series excitation, the field frame of the generator inherently provided this necessary reactance. A shortcoming of that generator was the fact that adjustments to lower the values of welder output involve a reduction of this reactance. It is advantageous on the other hand to provide an increase of reactance with lowered welding currents to insure arc stability. This invention provides that the inner and outer frame be so associated with respect to the series winding as to constitute an adjustable reactance in series with the welding arc. It provides that in adjustments to lower welding output, the mutual linkages of flux and field turns shall definitely increase in such proportion as to give a steady and smooth arc. This arrangement is unique in its simplicity and effectiveness. Only the main field leakage flux is involved in these adjustments.

Arc welding machines of the cross-field type in the past have depended entirely upon the residual magnetism to build up the cross-field voltage, which creates the cross magnetic field by circulating current through the short-circuited brushes. In order to assist in building up the cross-field voltage, this invention further contemplates the provision of a supplementary field coil cooperating with the main field coil and in circuit with the short-circuited brushes in the cross-field to assist in building up the primary field. This additional field flux control increases the stability of the arc welding generator, and creates better conditions at the welding arc. The supplementary field coil has the effect of raising the striking voltage of the arc.

It is, therefore, an object of this invention to provide an arc welding generator of the cross-field type in which the main field flux is capable of being diverted from the armature by means of a magnetic bridging or shunting means, so that the output of the machine can be controlled within wide limits.

It is a further object of this invention to provide an arc welding generator of the cross-field type in which the magnetic circuits within the machine are disposed in a manner to give proper adjustment of the flux linkages (reactance) associated with the welding current for all loads.

It is a further object of this invention to provide a supplementary field coil in circuit with the short-circuited brushes to provide a main field component which will maintain striking voltages of the generator at a relatively high value, so that the arc at the work structure may be quickly obtained at the beginning of the arc welding process.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Figure 4 illustrates, by curves, some general characteristics of the generator.

Figure 5 illustrates, by a set of curves, volt-ampere characteristics of the machine, externally and internally, at different positions of the magnetic shunt.

Figure 1:
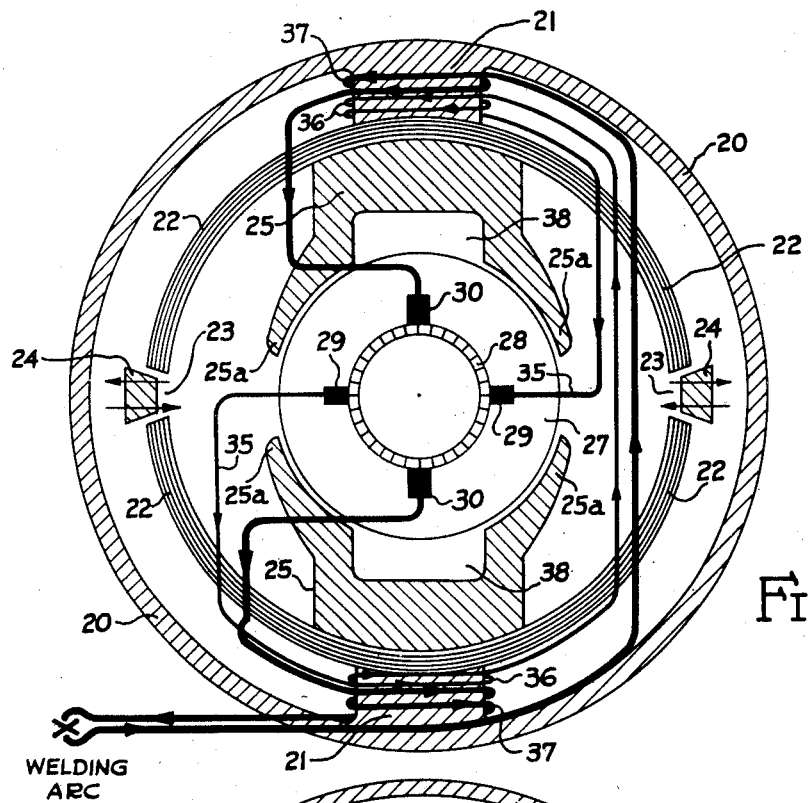
Figure 1 is a schematic diagram showing the essential elements and relations between these elements of an arc-welding generator to be disclosed hereinafter.

Referring to the drawings, particularly to Figure 1, an outer frame member 20 is provided which is of massive construction so as to be non-saturated by magnetic flux under operating condition of the generator and at the same time of such contour as to serve as an envelope in which the operating parts are positioned for protection. The envelope may be provided with apertures for proper ventilation as is well known in the art.

At diametrically opposed points on the outer frame member 20, pole studs 21 are provided which are preferably made integral with the frame member 20. These pole studs are of relatively limited cross-sectional area, so as to be subject to saturation during the operation of the machine as will be described hereinafter. Adjacent the inner end of the pole studs 21, laminated inner frame members 22 are provided which are preferably concentric with the outer frame member 20 and extend a considerable distance circumferentially from the pole studs 21. Each pole stud is provided with an inner frame member of this type. These inner frame members 22 cooperate with each other in a plane normal to the plane of the pole studs 21 to form an air gap 23 of considerable dimension on each side of the frame. The ends of these members may be oblique in form as shown. Movable magnetic blocks 24, preferably of wedge shape to cooperate with the oblique ends of the inner frame members are adapted to bridge the gaps 23 at selected times through the agency of a mechanism suitable for manual manipulation on the part of an operator. The mechanism for attaining this purpose is not shown but can be readily supplied by any number of different methods which are within the skill of any man informed in the art.

The magnetic blocks 24 cooperate with the inner frame members 22, to form a magnetic circuit with the outer frame member 20. The magnetic reluctance of the inner branch of this magnetic circuit is capable of having its magnetic reluctance varied within relatively wide limits by the manipulation of the magnetic blocks 24, for purposes to be described hereinafter.

Massive pole shoes 25 are provided to cooperate with the inner frame members 22 and the pole studs 21 and are adapted to hold the inner frame members 22 in position on the pole stud 21 in any convenient manner. The pole tips 25A of the pole shoes extend a considerable distance around the armature 27, and form return paths for flux generated by the armature and also shield the inner frame members from flux arising from armature reaction under normal load operation. The armature is provided with a commutator 28 to allow generated electric currents in the bars of the armature to be collected by means of two sets of brushes 29 and 30 positioned in different axes of the armature.

One set of brushes 29, which is positioned in a plane normal to the axis of the poles is short-circuited by means of a low resistance conductor 35 to create a cross-field flux as is well known in the art and disclosed by Rosenberg in the patent mentioned supra. The cross-field current flowing between the brushes of set 29 is generated by flux originating from the main field, and flowing between the pole shoes 25 through the armature 27. A proper open circuit voltage is attained by placing field coils 36 in circuit with the short-circuited brushes, the coils consisting of relatively few turns of heavy wire. This construction is clearly shown in Figure 1.

The second set of brushes 30, which is positioned in the plane of the field poles, 90 electrical degrees displaced from the plane of the brush set 29, is adapted to collect welding current to be used extraneously of the generator from the commutator 28. Field coils 37 are provided for primary excitation and are connected in series with the brushes 30. The welding circuit is then led to the exterior of the generator to a point where the welding operations are to be made. The series field coil 37 and the supplemental field coil 36 are positioned on the pole studs 21, which are the active magnetic elements between the main frame 20 and the inner frame members 22. As pointed out above, the cross-sectional area of the pole stud 21 is limited, so that at the higher flux densities created by the field coils, the pole studs 21 will tend to saturate and constrict the flux flowing therethrough, and aid in giving the drooping characteristic of the volt-ampere curves described later. The saturation of the pole studs 21 is under the control of the operator by variation of the position of the magnetic blocks 24. Flux flowing through the inner frame member 22 and the field leakage flux pass through the pole studs 21 and influence the saturation thereof to vary the characteristics of the machine. The field leakage flux, controlled by variation of the position of the magnetic blocks 24, influences the magnetic potentials at the junctures of poles and inner frame.

In order to improve the commutating conditions under which the brush set 30 operates, air gaps 38 are provided symmetrically positioned with the axis of the brush set 30. Commutating poles (not shown) may be positioned in these gaps to provide magnetic fields at these points to counteract the flux flowing in the main axis, so that the commutator bars, which are being contacted by the brushes 30, will have a minimum of voltage between them to make the commutation efficient and sparkless.

*Four-pole modification*

Figure 3:
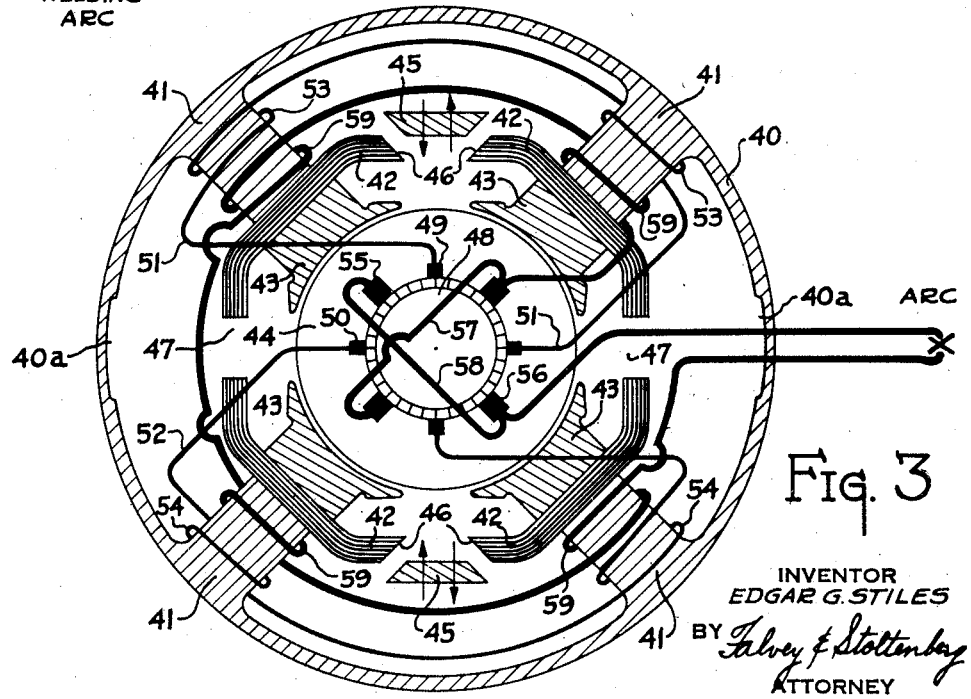
Figure 3 is a schematic diagram of a four-pole machine incorporating the same principles involved in the generator shown in Figures 1 and 2.

Referring to Figure 3, there is shown a modification of the arc welding generator in which the same principle of operation of the generator disclosed in Figure 1 is applied to a four-pole machine. An outer frame 40, which also serves as an envelope, is provided with four pole studs 41, preferably integral with and symmetrically disposed therein to which are attached inner frame members 42 in a manner similar to that disclosed in Figure 1. The inner frame members 42 are held in position upon the pole studs 41 in any convenient manner by means of pole shoes 43 which provide a tunnel in which an armature 44 is adapted to rotate.

Movable blocks 45 of magnetic material, are adapted to cooperate with oblique ends 46 of the inner frame members 42 and are also adapted to be moved by a mechanism (not shown) capable of being manually controlled so as to close the gap between the oblique ends 46 of the inner frame members 42. The opposite ends of the inner frame members 42 are preferably cut short to provide a wide gap 47 between them and preferably are not provided with movable magnetic blocks. In order to divide the machine into two separate magnetic circuits which are capable of being controlled by the movable magnetic blocks 45, (a magnetic circuit comprising generally a portion of the outer frame 40, two-pole studs 41 and the inner frame members 42 cooperating with the movable magnetic block 45) the outer frame member 40 is provided with constricted areas 40A which are capable of being saturated at predetermined flux densities to segregate the upper and lower magnetic circuits from each other.

The armature 44 is provided with a commutator 48 having four sets of brushes cooperating therewith. The brush sets 49 and 50 are adapted to be short-circuited by means of wires 51 and 52 respectively, which, at the same time, are connected to turns about the pole studs 41 to form supplementary field coils 53 and 54, respectively. The purpose of these coils has been described hereinbefore with reference to the modification shown in Figure 1. The remaining sets of brushes 55 and 56, being of substantially the same potential, are connected together by means of jumpers 57 and 58 and the circuit being continued to the series field coils 59 which are positioned on each of the pole studs 41. From thence, the circuit is led directly to extraneous leads with which welding operations may be properly performed.

The operation of this modification is similar to that disclosed in Figure 1 and will be described in detail hereinafter.

Operation

Figure 2:
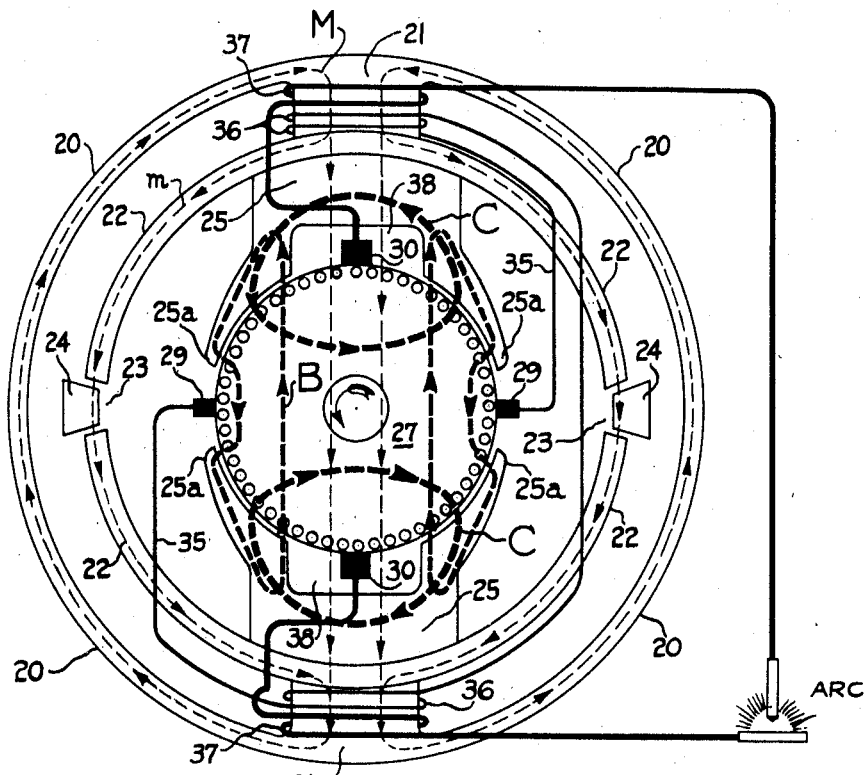
Fig. 2 is a schematic diagram showing the flux distribution in the magnetic paths of the generator.
Figure 6:
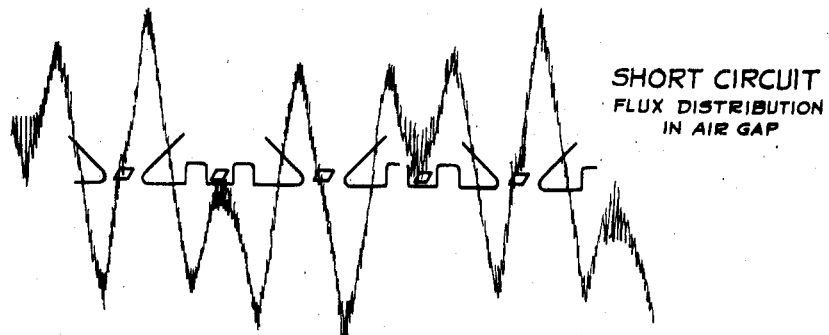
Figures 6, 7, 8 and 9 are illustrations of oscillographic readings of flux distributions in the air gap at various loads.
Figure 7:
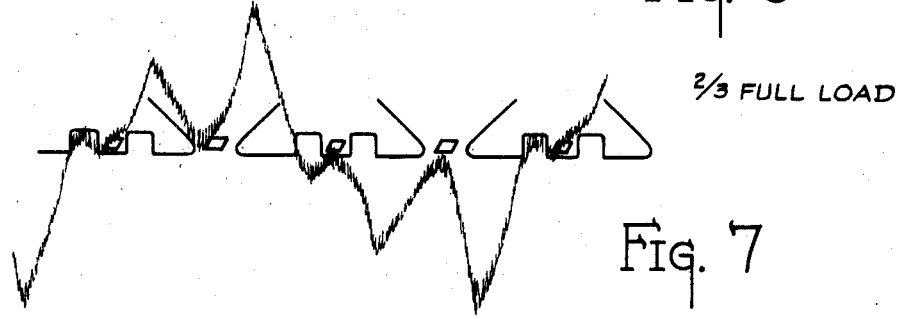
Figure 8:
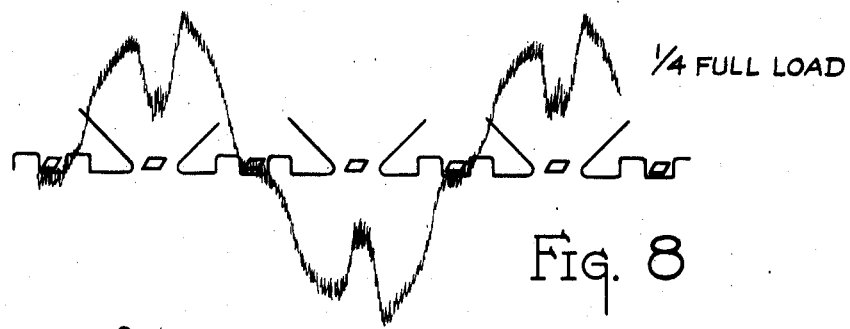
Figure 9:
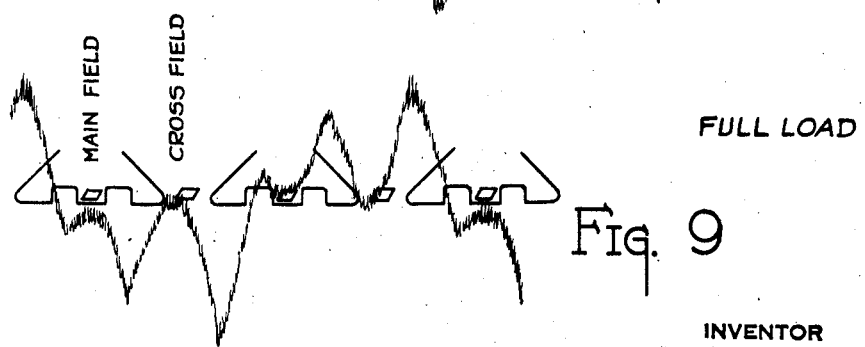

Referring to Figure 2, a schematic diagram is given of the arc welding generator in which the magnetic flux relations are illustrated by heavy broken lines. The main field flux M, which is generated by current flowing in the field coils 36 and 37, circulates from the pole stud 21 downwardly through pole shoe 25 through the armature 27, thence to the lower pole shoe 25 and returns through the outer frame members. Adjacent the end of the pole stud 21, at the points where the inner frame members 22 are joined therewith, the flux M is divided, so that a component m is carried by the inner field frame members in a path around the armature 27. Inasmuch as the magnetic reluctance of this parallel path, including the inner frame members 22 is controlled by the relative position of the magnetic blocks 24 in the gap 23, the amount of the flux m which flows in the inner frame members 22 is readily within the control of an operator. That flux which flows in the inner frame member 22 is ineffective to create voltage in the bars of the armature 27 thereby controlling the voltage which is created across the brush set 29 in the cross-field.

The main field magnetism M, upon starting of the machine, depends upon the residual magnetism of the magnetic members of the frame and pole shoes. This residual magnetism, acting upon the bars of the armature 27, builds up a voltage active across the brush set 29, and as this voltage increases, a current flows in the short-circuiting wire 35 and the supplementary field coils in circuit therewith to build up further the field magnetism. As the supplementary field coils 36 become more effective, the cross-field voltage builds up and the cross-field amperage obtains its maximum value as determined by the position of the magnetic blocks 24 in the gap 23 of the inner frame members to give the proper striking voltage across the brush set 30 in the welding circuit.

The short-circuiting current flowing between the brushes 29, through the short-circuiting wire 35 and the supplementary field coil 36, creates a cross-field flux C which flows in a circulatory path including the armature and the pole shoes which cover a large area of the armature surface. This cross-field acts substantially 90 electrical degrees displaced from the main field and produces an electrical potential across the brush set 30. The cross-field flux created in this manner is not directly affected by the position of the magnetic blocks 24 in the gap 23 but is controlled indirectly by the position of these blocks by their influence upon the main field flux M, as already described. The voltage generated by the resultant flux of these two magnetic flux circuits is effective across the brush set 30 and is available as the striking voltage for the arc.

After the arc is struck by an operator, current will immediately flow in the circuit including the brush set 30, the field coils 37, and the extraneous load leads. The flux created by this current in the series field winding 37 is cumulative to that created by the supplementary field windings 36, already described. As the current flows through the armature, an armature reaction is set up which creates a field which tends to buck the main field M, which is inherent in machines of the Rosenberg type. This flux forms a circulatory path as shown by the broken lines B in Figure 2. As the current in the extraneous welding circuit varies within wide limits, the armature reaction flux B also varies and creates a different flux distribution in the air gap as shown in Figures 8 to 11 by the oscillographic readings. However, armature reaction field B does not overcome the main field M so as to reverse the flux flowing through the pole studs 21 or the pole shoes 25 to change the magnetic relations of the machine. The flux field B created by the armature reaction, which apparently bucks the main field M, may create a different magnetic potential between the armature and the poles which may cause a greater amount of the flux to flow through the inner frame member 22, around the armature.

Curves taken from experimental data under varying conditions on the generator are illustrated in Figures 4 and 5. These figures demonstrate the operational characteristics of the machine, showing particularly the influence of the movable magnetic blocks 24 in the inner frame members 22, and will be discussed in detail hereinafter.

Referring to Figure 4, a set of curves is drawn with volts as ordinates and amperes as abscissa. Curves E, VE, and K were taken with the block 24 of magnetic material in its most remote position with reference to the gap 23, while curves A, VA, and N represent conditions when the block 24 of magnetic material substantially closes the gap 23. Curves E and A were drawn from observed data and indicate the air gap flux in a proportion to the field excitation; curve E illustrating the maximum air gap flux with the magnetic blocks 24 in remote position, and curve A illustrating the minimum air gap flux with the magnetic blocks 24 in position to close substantially the gaps 23. In the same manner, curves VE and VA illustrate the air gap flux proportional to the conditions in the machine when the field coils and the armature are in series as found in the normal operation of the machine. Here again VE indicates the air gap flux when the magnetic blocks are in remote position, and VA indicates the air gap flux while the magnetic blocks are in innermost position. Curves K and N are calculated from curves V and VE and A and VA respectively and indicate the magnetizing influence of the armature. Specifically, curve K is obtained by subtracting from the curve E, the values of the curve VE, and in a similar manner, curve N is obtained by subtracting from the curve A, the values of the curve VA.

In Figure 5, a series of curves were drawn to illustrate the influence of the movable magnetic block 24 upon the load characteristic and also the cross-field ampere characteristic. The curve A was taken simultaneously with the curve a, the former illustrating the load characteristic at the setting of the magnetic block selected and the latter the cross-field amperes at the same setting which are capable then of being compared. The curves bearing the same letters are comparative in the same sense as the two curves just discussed.

Figures 6 to 9 are oscillographic readings taken of the flux distribution in the air gap for the various loads indicated in the figures. These curves clearly illustrate the flux conditions at the points of commutation and particularly show the effect of the commutating pole at the center of the main poles. These curves also clearly indicate the conditions under which the brush set 29 is commutating in the cross-field. The magnetic potential of the pole tips is shown to be of the same polarity and of substantially equal potential in the curves for loads up to rated full load. It is only in the curve taken for short circuit, which is considerably over rated full load, that the magnetic potential of the adjacent pole tips is reversed. Even under this condition, commutation is still good and, at loads equal to rated full load and below, the magnetic potential of the pole tips creates conditions in the cross-field at the point of commutation which is favorable to efficient commutation.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed:

1. In a dynamo-electric machine of the cross-field type comprising in combination, a pair of field poles of opposite polarity with saturable supporting studs, an armature having a pair of short-circuited brushes disposed between the field poles, series field coils in circuit with main brushes of the armature and a load and positioned on the field pole studs, magnetic means of variable reluctances cooperating with the field pole studs to shunt magnetic flux created by the series field coils around the armature, and supplementary field coils positioned on the field pole studs and cumulative to the series field coils to stabilize the machine at light loads, the supplementary field coils being in circuit with the short-circuited brushes of the armature.

2. In a dynamo-electric machine of the cross-field type comprising in combination a pair of field poles of opposite polarity, a supporting yoke with saturable pole studs cooperating with the field poles, an armature having a pair of short-circuited brushes disposed between the field poles, a pair of main brushes, series field coils in circuit with the main brushes and a load and positioned on the field pole studs, parallel magnetic paths cooperating with the field pole studs and the series field coils, one of the arms of the magnetic paths being capable of being adjusted to vary its reluctance so that the magnetic influence of the series field coils on the field poles may be varied, and supplementary field coils cooperating with the series field coils on the field pole studs, said supplementary field coils being in circuit with the short-circuited brushes.

3. In a dynamo-electric machine of the cross-field type comprising in combination a pair of field shoes of opposite polarity, an armature having a pair of short-circuited brushes disposed between the field shoes, a pair of main brushes, series field coils in circuit with the main brushes and a load, pole studs cooperating with the pole shoes and the series field coils being saturable by a predetermined flux density, main frame members cooperating with the pole studs to form a non-saturated path for magnetic flux, inner frame members cooperating with the pole studs adapted to carry the series field flux by cooperating with the main frame members, and movable magnetic blocks in the inner frame members to control the magnetic reluctance of the inner frame members to vary the reactance of the series field winding, particularly to increase the reactance of the series field winding at low load values.

4. In a dynamo-electric machine of the cross-field type comprising in combination an armature, a pair of field shoes of opposite polarity embracing the armature over a relatively large area, a pair of short-circuited brushes disposed between the field shoes, a pair of main brushes, series field coils in circuit with the main brushes and a load, saturable pole studs cooperating with the pole shoes and threading the series field coils, main frame members cooperating with the pole studs at their outer ends to form a non-saturated magnetic path for field flux, inner frame members cooperating with the inner ends of the pole studs, and movable magnetic blocks in the inner frame members to control the magnetic reluctance of the inner frame members by changing an air gap therein, the position of the movable magnetic blocks determining the reactance of the series field coils to create a steady arc particularly at low load currents.

EDGAR G. STILES.